Nov. 4, 1952 H. F. MAURER 2,616,706

RECORD CHANGING DEVICE FOR PHONOGRAPHS

Filed Jan. 8, 1947 2 SHEETS—SHEET 1

INVENTOR.
HOWARD F. MAURER.

BY Lockwood, Goldsmith & Galt.
ATTORNEYS.

Nov. 4, 1952 H. F. MAURER 2,616,706

RECORD CHANGING DEVICE FOR PHONOGRAPHS

Filed Jan. 8, 1947 2 SHEETS—SHEET 2

INVENTOR.
HOWARD F. MAURER.
BY
Lockwood, Goldsmith & Galt,
ATTORNEYS.

Patented Nov. 4, 1952 2,616,706

UNITED STATES PATENT OFFICE 2,616,706

RECORD CHANGING DEVICE FOR PHONOGRAPHS

Howard F. Maurer, North Tonawanda, N. Y.

Application January 8, 1947, Serial No. 720,716

3 Claims. (Cl. 274—10)

This invention relates to a record changing device for automatic phonographs, particularly of the character shown and described in the application of Edward E. Collison and Gustav F. Erickson, Serial No. 672,922, filed May 29, 1945, for Letters Patent entitled "Selective Automatic Phonograph," and Letters Patent to Ralph R. Erbe, No. 2,139,812, granted December 13, 1938, entitled "Automatic Phonograph."

In the record changing mechanisms of the character embodied in the above Letters Patent, and particularly that disclosed in said application for Letters Patent, difficulty sometimes arose in the transfer of the record back to the magazine, possibly resulting in the breakage of the record. It is the purpose of this invention to improve upon said record changers to render positive the accurate alignment of the record to be returned to the magazine relative to its particular pocket, and thereby assure unobstructed transfer and replacement of the record in the magazine.

In such record changers, the magazine comprises a series of slightly spaced sheet metal partitions standing upright to provide a plurality of individual pockets in each of which a record is placed, the magazine being selectively positioned to present one of the pockets and its records to the transfer arms for rolling the selected vertically extending record from the magazine pocket to position for placement upon the turntable. In event one of the partitions should become bent, the record may be obstructed thereby or directed to the wrong pocket upon being returned. To insure against this condition occurring, the record transfer arms are so connected and related that the arm operating over the magazine will function to align the record and guide it to its proper pocket, and at the same time maintaining the partitions defining its pocket in their proper spaced relation.

The full nature of the invention will be understood from the accompanying drawings and the following specification and claims:

Figures 1, 6, 7:
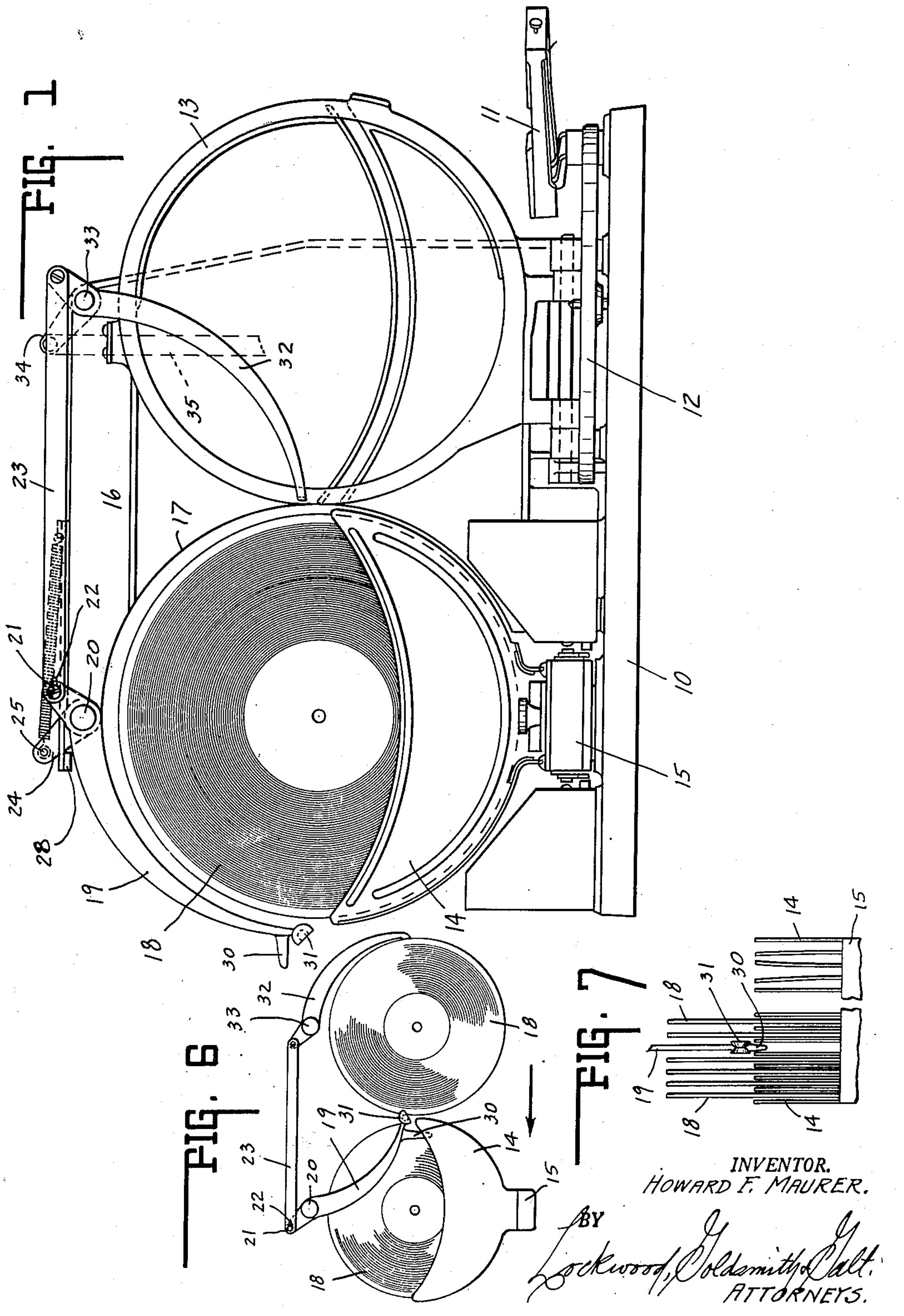
Fig. 1 is a front elevation of the record transfer device with the record changing arms in initial position.
Fig. 6 is the same as Fig. 4, showing the relation of the arms and record upon return movement of the record to the magazine.
Fig. 7 is a schematic illustration of a vertical section through the magazine and side elevation of the associated transfer arm and illustrative of a bent partition plate.

In the drawings there is shown a portion of a selective automatic phonograph, as more particularly illustrated and described in the above application for Letters Patent. Said phonograph includes a base plate 10, a tone arm and reproducer indicated at 11 mounted thereon for reproduction of a record placed on the turntable 12 by a record receiving and positioning ring 13. Laterally spaced of said ring there is provided a magazine comprising a series of spaced partition plates 14 carried by a reciprocating carriage 15. Between each of the upstanding partition plates 14 of the magazine, a record to be played is stored, and suitable means is provided (not shown herein, but as shown and described in said application) for selectively positioning the carriage 15 to align each record with the ring 13.

Mounted upon the base plate 10 there is an upstanding rigid back plate 16 having a circular cut away portion, as indicated at 17, to permit full movement of the magazine and the records 18 carried thereby. When in its upper vertical position the transfer ring 13 lies adjacent the forward face of said back plate.

Figures 2, 3, 4, 5:
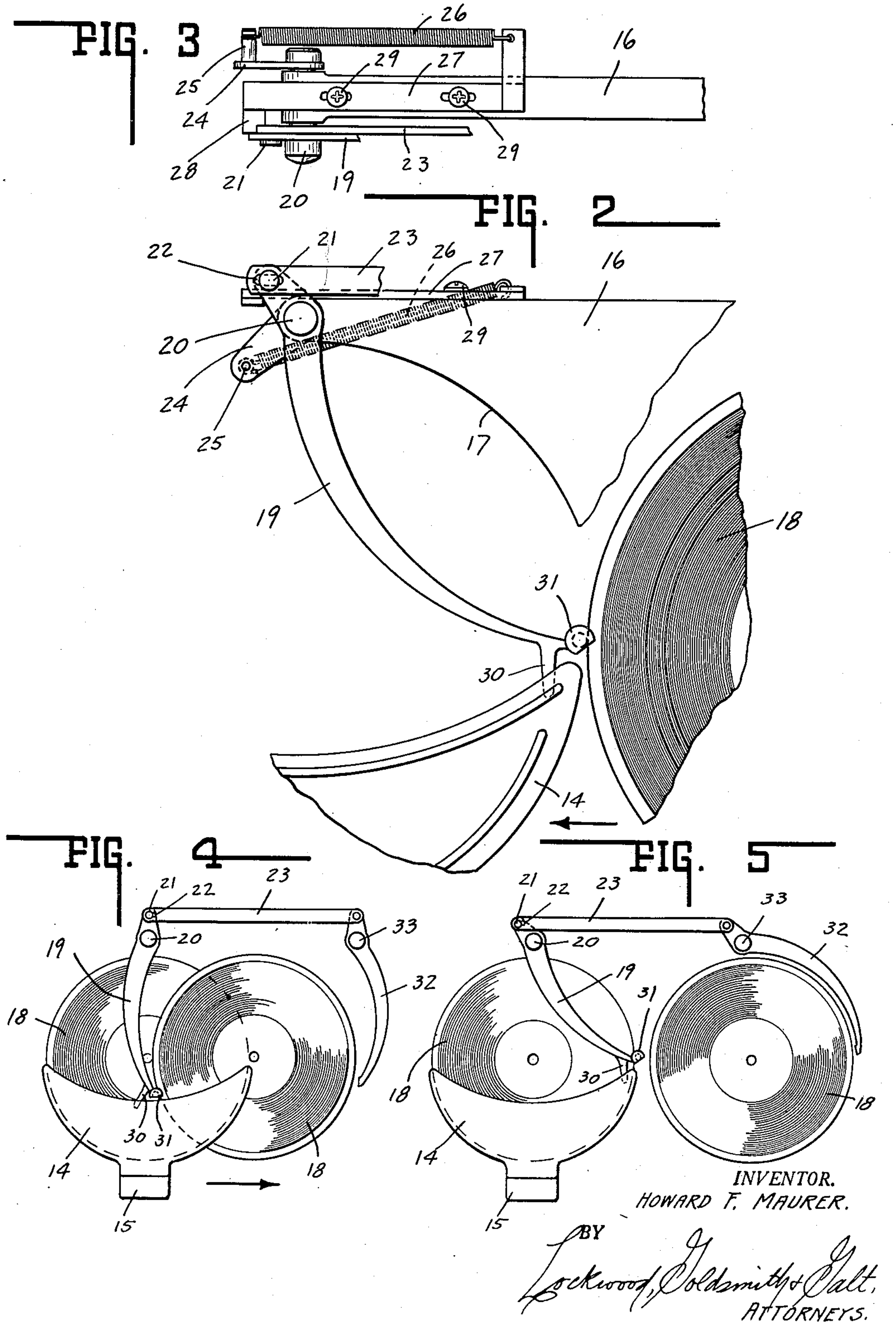
Fig. 2 is an enlarged view of the record changing arms associated with the magazine and positioned for aligning and guiding a record during its transfer back to the magazine.
Fig. 3 is a plan view of the mounting and actuating mechanism of the arm as shown in Fig. 2.
Fig. 4 is a schematic illustration showing the relation of the record changing arms in transferring a record from the magazine.
Fig. 5 is the same as Fig. 4 showing the position of the arms and record after transfer.

For transferring a selected record from the magazine to the transfer ring 13 for placement upon the turntable 12 there is provided an arcuate transfer arm 19, the upper portion of said arm being carried by a stud 20 which is pivotally mounted at the upper edge of the back plate so that said arm is fulcrumed on the back plate intermediate its ends but adjacent its upper end. The extreme upper end of said arm is provided with a lug 21 extending through an elongated slot 22 in a horizontally extending connecting rod 23 by means of which the arm is actuated as hereinafter described. On the other end of the stud 20 adjacent the rear face of the back plate there is provided a control arm 24 carrying a rearwardly extending rivet 25 yieldingly connected by a spring 26 to the inner end of the anchor bar 27. The outer end of said anchor bar is formed with a laterally extending stop 28 for limiting the movement of the arm in its extreme record transfer position, as shown in Fig. 2. Said stop is adjustable to control the extreme forward position of the arm through the pin and slot engagement of the screw 29 for securing the anchor bar 27 over the top edge of the back plate.

The actuating end of the transfer arm is provided with a downwardly extending spacing member 30 adapted to extend between the magazine partition plates 14 to maintain them in proper spaced relation for entry of the returning record, and at the same time act as a guide for maintaining alignment between the actuating end of the arm and the magazine partitions between which the record is to be received. It is to be understood that the record to be received has been removed from the magazine pocket defined by said spaced partition plates between which the spacing member rides. Also on the extreme actuating end of the transfer arm 19 there is a grooved head 31 for receiving the edge of the record 18 just prior to its entry into the magazine upon being returned thereto. Thus, just prior to and during the return of the record to its pocket between the plates 14, it will first be aligned with the pocket and then guided to its position therein.

For returning the record from the ring 13 to the magazine there is a record return arm 32 which operates in unison with the arm 19 in parallelogram relation. The arm 32 is fulcrumed adjacent its upper end upon the back plate 16 by a swivel stud 33 with which the arm is connected at one end. The other end of the stud on the opposite face of the back plate is provided with a lever 34 having a link connection 35 with an actuating cam for causing the arm 32 to swing in an arc between opposite sides of the ring 13. Said arm is actuated by the link 35 in a manner described in said above-mentioned application for transferring the record from the magazine and returning it thereto after reproduction, and upon the record being raised to vertical position in alignment with its magazine pocket by the ring 13.

The upper extreme end of the arm 32 is pivotally connected with the connecting rod 23 so as to cause the arm 19 to move substantially in unison with the arm 32.

The arms are shown at rest and in initial position in Fig. 6, free of the record 18 so as to permit selective movement of the magazine. As schematically illustrated in Figs. 4–6, upon selection of a record, it is engaged by the transfer arm 19 and rolled in a direction indicated by the arrow in Fig. 4 into concentric relation with the ring 13 for transfer to the turntable. During this movement, the return arm 32 backs away free of the record so as not to interfere. As shown in Fig. 5, the record is in position within the ring 13 to be transferred to the turntable free of the arms 19, 32. The record is then lowered into horizontal playing position on the turntable by the ring 13, and after play is lifted to its vertical position as described in the above-mentioned application for Letters Patent. It is then returned to the same pocket of the magazine from which it was removed, by the return arm 32.

As shown in Fig. 6, just prior to the record entering its pocket between the partitions 14, its forward edge engages the grooved head 31 of the transfer arm 19, said transfer arm being maintained in a forward position under tension of spring 26, but limited by the stop 28 so as not to interfere with the movement of the record by the ring 13. In such position the spacing member 30 of the arm 19 is maintaining the partitions 14 in their proper spaced relation for receiving the record. As the record is about to enter the pocket in the direction of the arrows, it is guided therein by the grooved head 31 against the tension of spring 26, the slot 22 permitting of a slight relative movement between the arms under said spring tension. Thus, the record is in effect yieldingly clamped between said arms and aligned with its pocket which is maintained open to receive it until after the record has entered. Thereupon the record and arms continue their travel until the record is finally returned to its position in the magazine and the arms freed thereof, as shown in Fig. 1.

From the above, it will be understood that during the return of the record to its magazine pocket, and when the arm 19 reaches approximately the position shown in Fig. 4, the control arm 24 is beyond its dead center line position with respect to the spring 26. Said spring thereupon yieldably displaces the arm 19 away from the record, after the record has been guided thereby into the pocket, to its relative position beyond the periphery of the record as in Fig. 1.

The invention claimed is:

1. In an automatic phonograph, a plurality of spaced magazine partitions between which records are adapted to be individually carried, a record transfer arm having an actuating end in clearance relation to said partitions, mechanism for moving said arm to cause its actuating end to engage the edge of a record and eject it from said partitions for play, a member in laterally-spaced, opposing relation to said arm and operable in unison therewith to engage and return said record after play, means operative to present the actuating end of said arm to the leading edge of said record upon its return and guide it to its original position between said partitions, and a projection on said arm extending its actuating end and movable between adjoining partitions for maintaining them in record receiving spaced relation prior to and during the entry of the record therebetween.

2. In an automatic phonograph, a plurality of spaced magazine partitions between which records are adapted to be individually carried, a record transfer arm having an actuating end, mechanism for moving said arm to engage the edge of a record and eject it from said partitions for play, a member operable to engage and return said record after play, a grooved head on the actuating end of said transfer arm in clearance relation to said partitions, a spring associated with said mechanism operative to yieldingly present said head to the leading edge of the record upon its return to guide it between said partitions, and a projection associated with and depending below said head and adapted to extend between said partitions for maintaining them in spaced relation during return of said record and its entry therebetween.

3. In an automatic phonograph, a plurality of spaced magazine partitions between which records are adapted to be individually carried, a record transfer arm having an actuating end, mechanism for moving said arm to cause its actuating end to engage the edge of a record and eject it from said partitions for play, a member operable to engage and return said record to its position between said partitions after play, and a projection extending below and rearwardly of the actuating end of said record transfer arm and movable between adjoining partitions for maintaining them in record receiving spaced relation prior to and during the entry of the record therebetween.

HOWARD F. MAURER.

REFERENCES CITED

The following references are of record in the file of this patent:

UNITED STATES PATENTS

| Number | Name | Date |
|---|---|---|
| 2,137,276 | Erbe | Nov. 22, 1938 |
| 2,281,548 | Andrews | May 5, 1942 |
| 2,287,560 | Osborne et al. | June 23, 1942 |
| 2,496,056 | Lannerd | Jan. 31, 1950 |